(12) United States Patent
Bracalente et al.

(10) Patent No.: US 10,964,133 B2
(45) Date of Patent: Mar. 30, 2021

(54) VEHICLE SAFETY SYSTEM WITH SMART DETECTION SENSORS

(71) Applicant: ZF ACTIVE SAFETY AND ELECTRONICS US LLC, Livonia, MI (US)

(72) Inventors: Marco Bracalente, Novi, MI (US); Keith Miciuda, Grosse Pointe Park, MI (US)

(73) Assignee: ZF ACTIVE SAFETY AND ELECTRONICS US LLC, Livonia, MI (US)

(*) Notice: Subject to any disclaimer, the term of this patent is extended or adjusted under 35 U.S.C. 154(b) by 0 days.

(21) Appl. No.: 15/991,084

(22) Filed: May 29, 2018

(65) Prior Publication Data

US 2019/0371088 A1 Dec. 5, 2019

(51) Int. Cl.
*G07C 5/08* (2006.01)
*B60R 21/015* (2006.01)
*B60R 21/013* (2006.01)
*B60R 21/01* (2006.01)

(52) U.S. Cl.
CPC .......... *G07C 5/0808* (2013.01); *B60R 21/013* (2013.01); *B60R 21/01546* (2014.10); *B60R 21/01554* (2014.10); *G07C 5/0816* (2013.01); *B60R 2021/01006* (2013.01); *B60R 2021/01027* (2013.01); *B60R 2021/01068* (2013.01); *B60R 2021/01109* (2013.01); *B60R 2021/01286* (2013.01)

(58) Field of Classification Search
USPC .......................................................... 701/45
See application file for complete search history.

(56) References Cited

U.S. PATENT DOCUMENTS

| | | | | |
|---|---|---|---|---|
| 5,810,392 A | * | 9/1998 | Gagnon ................. | B60N 2/002 180/268 |
| 6,205,400 B1 | * | 3/2001 | Lin ....................... | G01C 21/165 342/357.31 |
| 6,891,111 B1 | * | 5/2005 | Morell ................... | B60N 2/002 177/144 |

(Continued)

FOREIGN PATENT DOCUMENTS

KR 19990069547 A * 2/1999

OTHER PUBLICATIONS

Google Machine Translation in English of of Korean Patent Application Pub. No. KR19990069547A (1999).*

*Primary Examiner* — Jean Paul Cass
(74) *Attorney, Agent, or Firm* — Tarolli, Sundheim, Covell & Tummino LLP

(57) ABSTRACT

A state detection sensor includes a housing and a position sensing component mounted in the housing. The position sensing component is being configured to provide position data in response to detecting the presence or position of vehicle structure relative to the sensor. The state detection sensor also includes an analog input component mounted in the housing. The analog input component is configured to provide external analog sensor data in response to an analog signal received from an external analog sensor to which the analog input component can be operatively connected. The state detection sensor further includes a component configured to communicate the position data and the external analog sensor data via a serial bus.

17 Claims, 8 Drawing Sheets

(56) References Cited

U.S. PATENT DOCUMENTS

| | | | |
|---|---|---|---|
| 8,688,180 B2* | 4/2014 | Catten | H04W 24/08 |
| | | | 455/575.9 |
| 9,327,678 B1* | 5/2016 | Stockmeier | B60R 22/48 |
| 9,546,920 B2* | 1/2017 | Kuebler | B60N 2/002 |
| 9,650,016 B2* | 5/2017 | Andreen | G06K 9/4633 |
| 9,799,197 B2* | 10/2017 | Pham | G08B 21/18 |
| 9,847,010 B2* | 12/2017 | Pham | A62B 35/0025 |
| 2005/0067828 A1* | 3/2005 | Norton | G01L 1/02 |
| | | | 280/806 |
| 2006/0267385 A1* | 11/2006 | Steenwyk | B60N 2/06 |
| | | | 297/217.1 |
| 2008/0084290 A1* | 4/2008 | Hawkins | B60R 21/01546 |
| | | | 340/457.1 |
| 2010/0201542 A1* | 8/2010 | Harnett | H04Q 9/00 |
| | | | 340/870.28 |
| 2011/0127583 A1* | 6/2011 | Uhlig | H01L 1/02 |
| | | | 257/252 |
| 2012/0213531 A1* | 8/2012 | Nazarathy | H03M 3/434 |
| | | | 398/202 |
| 2017/0195953 A1* | 7/2017 | Amorim de Faria Cardote | |
| | | | H04L 67/10 |
| 2017/0283086 A1* | 10/2017 | Garing | B64D 45/0005 |

\* cited by examiner

VEHICLE SAFETY SYSTEM WITH SMART DETECTION SENSORS

TECHNICAL FIELD

This disclosure relates to a vehicle safety system including sensors for sensing vehicle and occupant conditions and a controller for receiving data from the sensors. Based on the data, the controller determines whether a vehicle crash event has occurred, determines vehicle and/or occupant conditions at the time of the crash. The controller can then determine which of one or more vehicle occupant protection devices to actuate in response to those determinations. More particularly, this disclosure relates to improved smart state detection sensors that communicate certain vehicle and/or occupant conditions to the controller via a power/communication bus.

BACKGROUND

Vehicle safety systems include various sensors for detecting vehicle and/or occupant conditions. The vehicle safety system can utilize this vehicle and/or occupant condition information determined via the sensors for a variety purposes. The vehicle/occupant condition information can be used to alert vehicle occupants of certain conditions (e.g., a "seatbelt unbuckled" warning) or to tailor the actuation of vehicle occupant protection devices, such as airbags, seatbelt pre-tensioners, etc. As such, the sensors can include seatbelt buckle latch sensors, vehicle passenger presence detection (PPD) sensors (e.g., seat bottom pressure/weight sensors), and seat position sensors (e.g., seat track position sensors (STPS)).

A known system is illustrated schematically in FIG. 1. As shown in FIG. 1, the vehicle safety system 10 includes an electronic controller unit (ECU) 12 configured to communicate with a variety of sensors for sensing vehicle/occupant conditions. The ECU 12 can, for example, be a controller that is configured to control the actuation of vehicle instrumentation, vehicle alerts/warnings, or vehicle occupant safety devices, such as airbags and seatbelts, based on information received from the illustrated sensors and other sensors (not shown) such as crash sensors.

For the system 10 of FIG. 1, the number (N) of sensors can correspond to the number of seats or seating positions in the vehicle, and thus are numbered 1, 2, . . . N in FIG. 1. Those skilled in the art will appreciate that, for certain vehicles, the number and types of sensors included may change depending on the seat position in the vehicle. For example, in most vehicles, rear seats are not adjustable fore and aft and thus may not include a seat track position sensor.

The sensors of the system 10 can include buckle sensors 20, passenger presence detector (PPD) sensors 30, and seat track position sensors (STPS) 40. The system 10 can include other sensors (not shown), such as seat recline sensors and seat weight sensors. As shown, the sensors 20, 30, 40 of the typical system 10 are individually wired and require at least two wires. As a result, wiring harness(es) 50 can become large/bulky, heavy, complicated, and difficult to work with and to install. Additionally, since the system 10, including the ECU 12, is often housed in the vehicle center tunnel, and because space in the center tunnel is at a premium, it is becoming increasingly desirable to reduce the size, weight, and bulk of the wiring harness(es) 50.

SUMMARY

According to one aspect, a state detection sensor includes a housing and a position sensing component mounted in the housing. The position sensing component is being configured to provide position data in response to detecting the presence or position of vehicle structure relative to the sensor. The state detection sensor also includes an analog input component mounted in the housing. The analog input component is configured to provide external analog sensor data in response to an analog signal received from an external analog sensor to which the analog input component can be operatively connected. The state detection sensor further includes a component configured to communicate the position data and the external analog sensor data via a serial bus.

According to another aspect, alone or in combination with any other aspect, the position sensing component can include a Hall effect sensor.

According to another aspect, alone or in combination with any other aspect, the analog input component can include an interrogation circuit configured to supply bus power to the external analog sensor in order to interrogate the external analog sensor.

According to another aspect, alone or in combination with any other aspect, the external analog sensor can include comprises a resistance sensor.

According to another aspect, alone or in combination with any other aspect, the external analog sensor can include a strain gauge or a variable resistor.

According to another aspect, alone or in combination with any other aspect, the state detection sensor can include a seatbelt buckle sensor, wherein the position sensing component comprises a buckle latch sensor, and the external analog sensor comprises a passenger presence detection sensor.

According to another aspect, alone or in combination with any other aspect, the buckle latch sensor can include a Hall effect sensor configured to detect a magnetic field indicative of the buckle being in a latched condition.

According to another aspect, alone or in combination with any other aspect, the buckle latch sensor can include a resistive buckle latch sensor configured to detect a change in resistance indicative of the buckle being in a latched condition.

According to another aspect, alone or in combination with any other aspect, the state detection sensor can include a vehicle seat sensor, wherein the position sensing component comprises a seat track position sensor.

According to another aspect, alone or in combination with any other aspect, the buckle latch sensor can include a Hall effect sensor configured to detect a magnetic field indicative of the buckle being in a latched condition.

According to another aspect, alone or in combination with any other aspect, the external analog sensor can include a vehicle seat recline position sensor.

According to another aspect, alone or in combination with any other aspect, the state detection sensor can include an application specific integrated circuit (ASIC) comprising at least a portion of the position sensing component and at least a portion of the analog input component.

According to another aspect, alone or in combination with any other aspect, the state detection sensor can include a Hall effect sensor operably connected to the ASIC and configured to cooperate with the ASIC to perform position sensing functions.

According to another aspect, alone or in combination with any other aspect, the state detection sensor can include discrete analog components operably connected to the ASIC and configured to cooperate with the ASIC to perform interrogation functions on the external analog sensor.

According to another aspect, alone or in combination with any other aspect, the position sensing component and the analog input component of the state detection sensor each can include at least one of: application specific standard product (ASSP) ICs, field programmable gate arrays (FPGA), memory modules (ROM, RAM, EEPROM, flash, etc.), microcontrollers, system on a chip (SOC) devices, CMOS logic state devices, and discrete electronic components.

According to another aspect, alone or in combination with any other aspect, the position sensing component can include a position sensor IC and the analog input component comprises an analog sensor IC.

According to another aspect, alone or in combination with any other aspect, the position sensor IC can include a Hall effect sensor IC.

According to another aspect, alone or in combination with any other aspect, the position sensor IC and the analog input IC are individually addressable devices and can be polled via a serial bus individually.

According to another aspect, a vehicle safety system can include the state detection sensor, an electronic controller unit (ECU), and a two-wire power/communication bus operatively connected to the ECU, wherein the state detection sensor includes connectors for connecting the sensor to the bus in parallel.

DRAWINGS

DESCRIPTION

A vehicle safety system includes sensors for sensing vehicle and occupant conditions and a controller for receiving data from the sensors. Based on the data, the controller determines whether a vehicle crash event has occurred, determines vehicle and/or occupant conditions at the time of the crash, and actuates one or more vehicle occupant protection devices in accordance with those determinations. This disclosure relates to an improved smart state detection sensors that communicate certain vehicle and/or occupant conditions via a power/communication bus. By "smart state detection sensor," it is meant that the sensor device senses one or more states (i.e., conditions) of an associated vehicle component and/or occupant and is "smart" in the sense that it can be programmed or otherwise configured to associate the sensed state(s) with a seating position in the vehicle, and also may have some computer processing capabilities.

Figure 2:
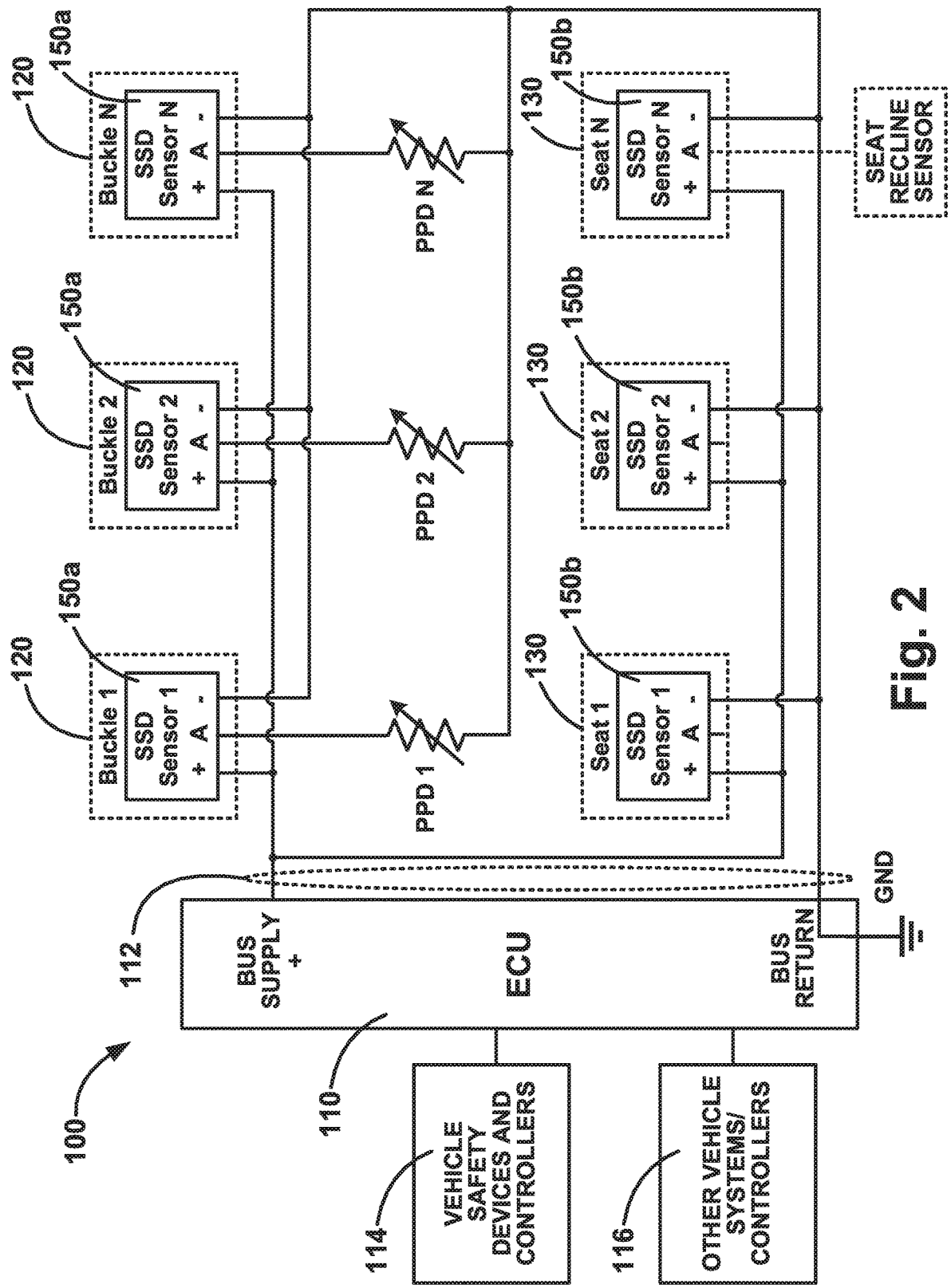
FIG. 2 is a schematic illustration of a vehicle system, according to an example configuration.

Referring to FIG. 2, a vehicle system comprises a vehicle safety system 100 includes an electronic controller unit (ECU) 110 configured to communicate with a variety of sensors for sensing vehicle/occupant conditions. The ECU 110 can be connected to other vehicle systems/controllers 116 via a controller area network (CAN) bus or local interconnect network (LIN) bus. In one example configuration, the ECU can be a node on the vehicle CAN bus and can thereby communicate with other nodes, such as a body control module (BCM) or an airbag controller.

The ECU 110 can, for example, be a separate controller dedicated to monitoring the vehicle/occupant conditions described herein. As another example, the ECU 110 can be an airbag controller that is configured to control the actuation of vehicle occupant safety devices, such as airbags and seatbelts, based on information received from the illustrated sensors and other sensors (not shown) such as crash sensors. As a further example, the ECU 110 can be a portion of a vehicle controller, such as a body control module (BCM) that also monitors and controls various vehicle systems, such as electric windows, A/C functions, electric mirrors, electric door locks, remote keyless entry, security systems, and that communicates with other controllers, such as airbag controllers, anti-lock brake controllers, stability control system controllers, etc.

Regardless of how the ECU 110 is embodied within the vehicle safety system 100, the system is configured to help control the actuation of vehicle safety devices and controllers 114, such as airbags and seatbelts, either directly via the ECU 110 or indirectly via the ECU communicating with other vehicle controllers or systems. In doing this, the actuation and deployment of the vehicle safety devices can be tailored in response to the data provided to those systems by or through the ECU 110.

Figure 1:
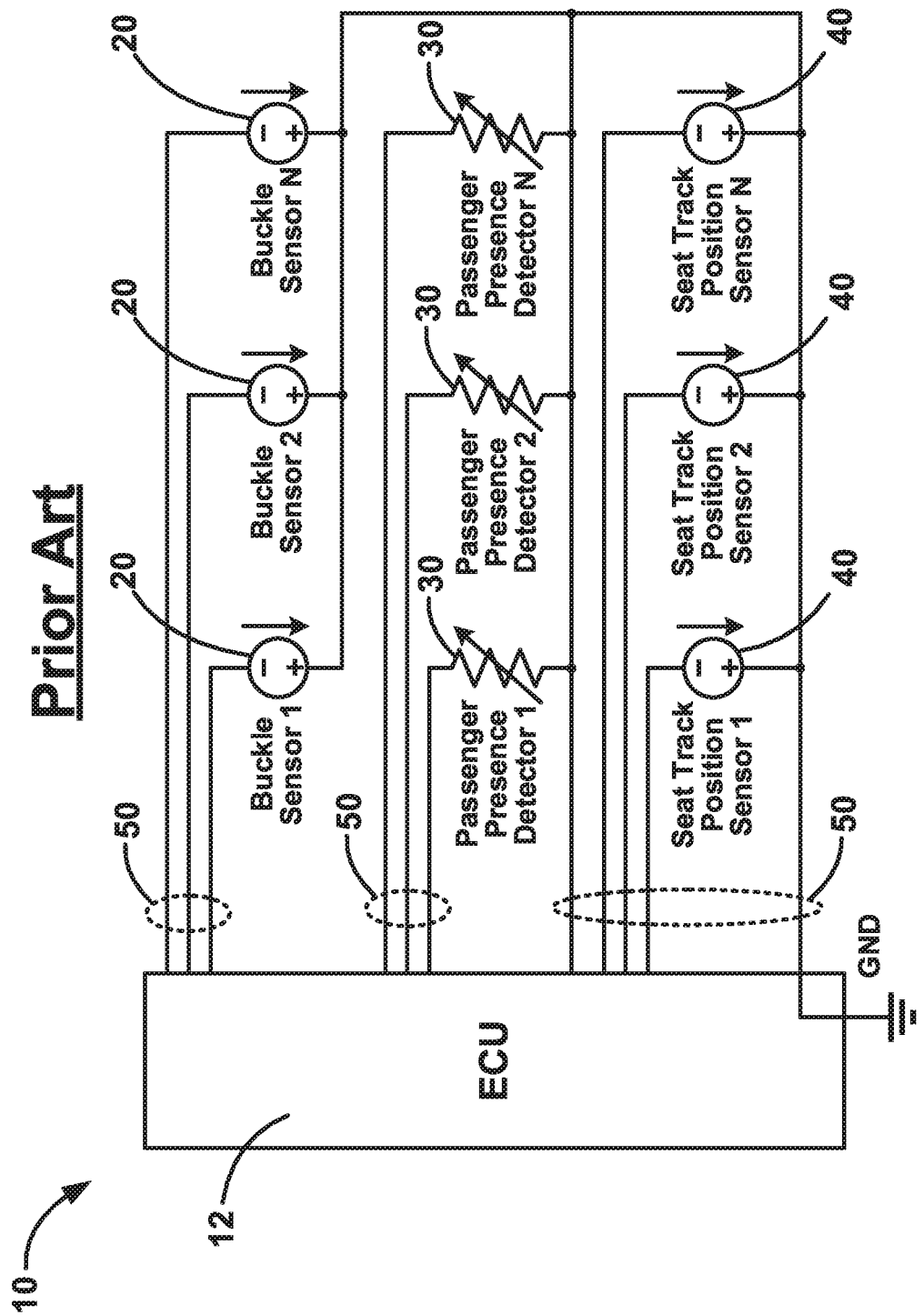
FIG. 1 is a schematic illustration of a known vehicle safety system.

For the vehicle safety system 100 of FIG. 2, the number (N) of sensors can correspond to the number of seats or seating positions in the vehicle, and thus are numbered 1, 2, . . . N in FIG. 1. Those skilled in the art will appreciate that, for certain vehicles, the number and types of sensors included may change depending on the seat position in the vehicle. For example, in most vehicles, rear seats are not adjustable fore and aft and thus may not include a seat track position sensor.

The vehicle safety system 100 includes smart state detection (SSD) sensors 150 that communicate with the ECU 110 via a power and communication BUS 112. In the example configuration, the system 100 includes an SSD sensor 150 associated with each vehicle seatbelt buckle 120 and with each vehicle seat 130. The SSD sensors 150 are mountable to their respective buckles 120 and seats 130 and can have a form factor configured to allow for their replacing conventional buckle/seat mounted sensors. The BUS 112 can be a two-wire (e.g., twisted pair) bus with the SSD sensors daisy chained or otherwise connected (e.g., drop or stub connected) to the BUS in parallel.

The ECU 110 comprises a BUS controller for controlling the operation of the BUS 112 and polling the devices, i.e., the SSD sensors 150, connected to the bus. Each SSD sensor 150 is individually addressable and the ECU 110 polls the sensors using conventional addressing protocol techniques. For example, the ECU 110 can operate the BUS 112 using a serial bus protocol that is similar or identical to that implemented in a vehicle CAN bus architecture.

However, the BUS 112 can be dedicated to sensing signals only from the SSD sensors 150 and can therefore implement an addressing protocol that is simplified in that it is designed to obtain data from those specific devices. According to one simplified addressing protocol, the SSD sensors 150 can be polled by modulating the bus supply voltage. In this example, the bus supply voltage is brought down to 0V, which resets all of the SSD sensors 150 on the BUS 112. The bus voltage is then raised to a nominal bus low voltage($V_L$). The bus voltage is then toggled to transition the bus voltage from $V_L$ to a bus high voltage ($V_H$) and back to $V_L$, which increments the bus address to the first addressed sensor. The ECU 110 then polls that sensor and awaits a signal response from the polled sensor address. Once received, or after a timeout occurs having not received a response, the ECU executes another voltage transition, i.e., transition from $V_L$ to $V_H$ and back, to increment the polled bus address.

Figure 3:
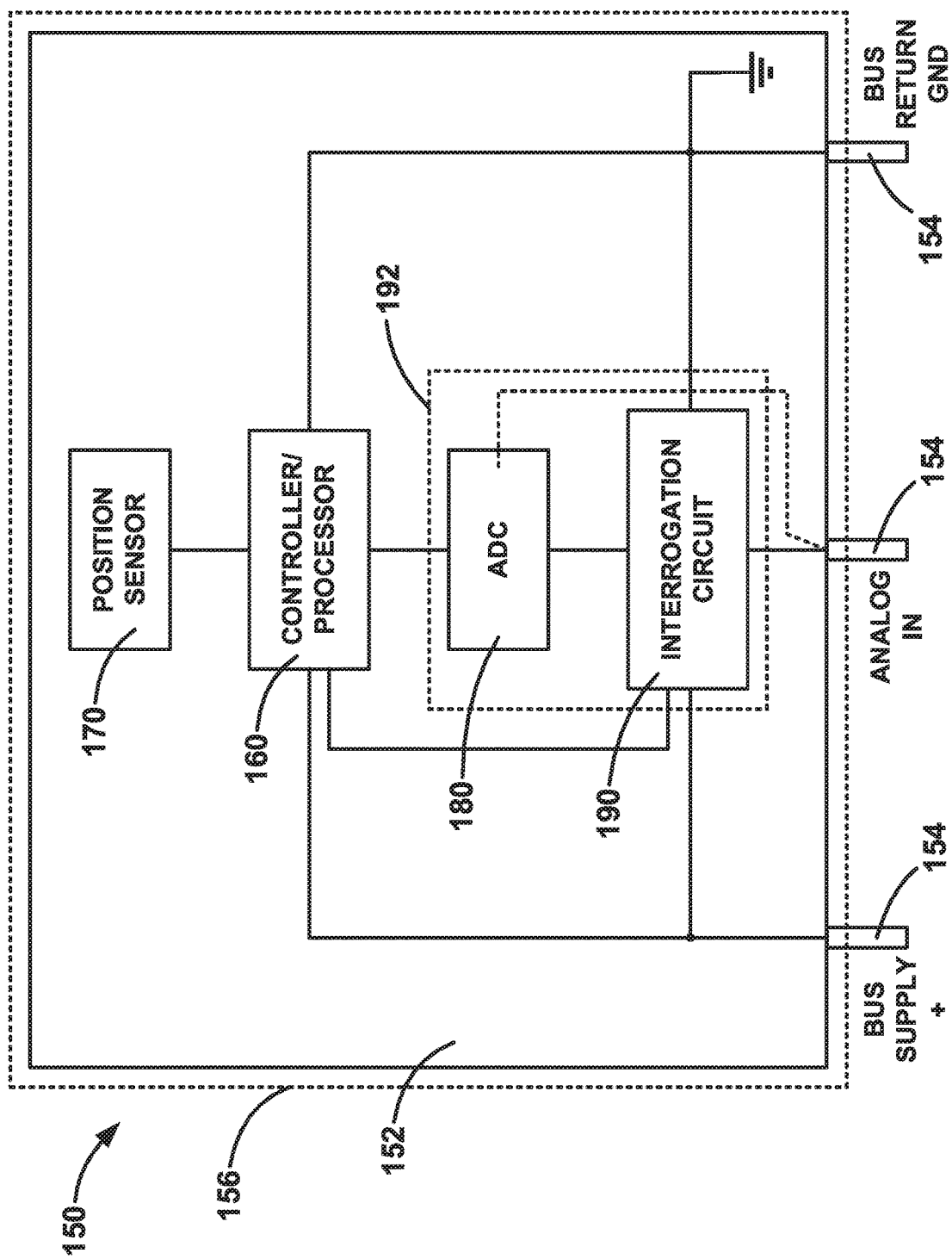
FIG. 3 is a functional block diagram illustrating a smart state detection sensor that forms a portion of the vehicle system of FIG. 2.

An SSD sensor 150 according to one example configuration is illustrated schematically in FIG. 3. FIG. 3 is a functional block diagram that illustrates the various functions performed by the SSD sensor 150. These various functions can be carried out utilizing a variety of solid state electronic components and/or circuit configurations. Functionally, the SSD sensor 150 is configured and arranged to perform one or more vehicle/occupant condition sensing functions. More specifically, the SSD sensor 150 is configured to have self-contained onboard position sensing component and also a component configured to accept an analog input signal. Advantageously, the SSD sensor 150 is configured to digitize the received external analog signal, to package the digitized analog data along with data from the onboard position sensing, and to communicate the packaged data to the ECU 110 via the BUS 112.

In the example configuration of FIG. 3, the SSD sensor 150 includes a housing 156 that supports the sensor components, which may include a substrate 152, such as a printed circuit board (PCB), upon which other sensor components are mounted. The SSD sensor 150 also includes three inputs 154: one for the data bus supply (BUS SUPPLY+), one for bus return (BUS RETURN GND), and one for the analog input (ANALOG IN). The inputs 154 can be accessed external to the housing 156 and can be configured for connections to external wiring via standard electrical connectors. Additionally, the inputs 154 can be ganged for convenience, if desired. For example, BUS SUPPLY+ and BUS RETURN GND inputs 154 can be ganged in a single (e.g., two-pin) electrical connector, and the ANALOG IN input 154 can be a separate electrical connector. The housing 156 protects the components and can be configured and arranged (e.g., size, shape, form factor) to facilitate mounting the sensor 150 in a desired location.

Functionally, the SSD sensor 150 includes a component for implementing controller functions 160, a component for implementing position sensor functions 170, a component for implementing analog to digital converter (ADC) functions 180, and a component for implementing interrogation circuit functions 190. Collectively, the components 180 and 190 form an analog input component 192. The controller component 160 can communicate with each of the other components 170, 180, 190, and also control communications via the BUS 112, for example, via traces on the PCB 152. As such, it should be appreciated that the controller component 160, while illustrated as a single component, can have various forms and may in fact comprise various discrete components configured to perform a specific task. These tasks can include controlling the operation of the position sensor component 170, controlling operation of the interrogation circuit component 190, interfacing with the ADC component 180, and handling communications via the BUS 112 of the data obtained via the position sensor component 170 and the ANALOG IN input 154.

The components for implementing the various functions illustrated in FIG. 3 can be implemented via a variety of hardware configurations, including custom-designed application specific components, standard off-the-shelf components, or a combination of custom and standard components. Examples of these various configurations are illustrated in FIGS. 4A-4C.

Figure 4A:
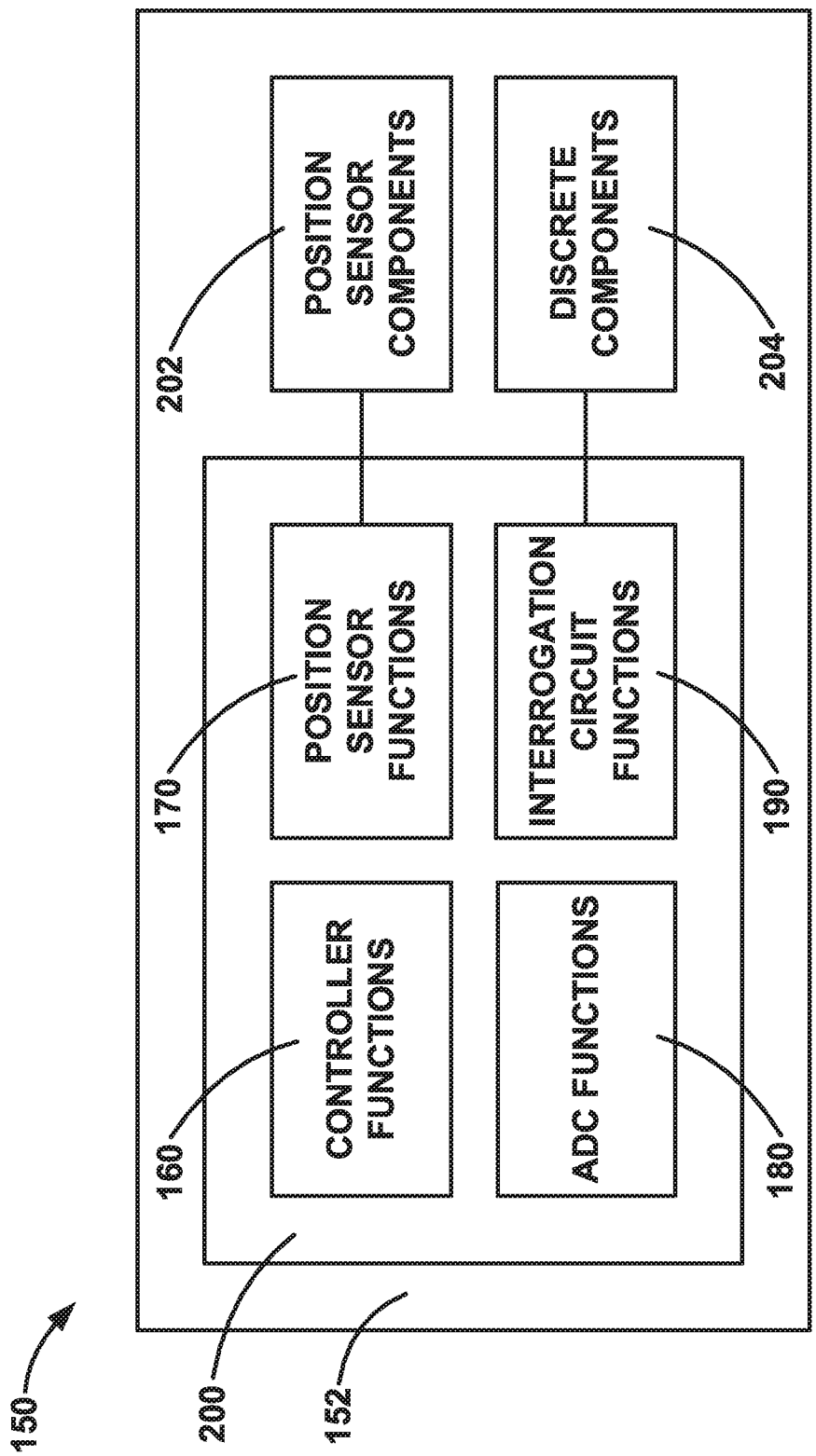
FIGS. 4A-4C are schematic illustrations of example configurations of the smart state detection sensor of FIG. 3.

A to the example configuration illustrated in FIG. 4A, the SSD sensor 150 can comprise an application specific integrated circuit (ASIC) 200 designed to perform all or a majority of these functions (see FIG. 3) on a single custom IC. This configuration could be ideal in terms of functionality and package size and could be advantageous in permitting the SSD sensor 150 to replace current seatbelt buckle-mounted and seat-mounted switches. In this configuration, the single ASIC 200 could include controller component 160, position sensor component 170, ADC component 180, and interrogation circuit component 190.

Those skilled in the art will appreciate that, in this example configuration of the SSD sensor 150, certain components in addition to the ASIC 200 may be required, as it may not be possible or feasible to implement certain components in the ASIC itself. For example, certain components 202 for performing the position sensor functions 170, such as a Hall effect sensor component, may not be implemented in the ASIC 200 itself and may be implemented as separate components that communicate with the ASIC, for example, through traces on the PCB 152. As another example, discrete electronic components 204, such as resistors, capacitors, transistors, diodes, etc., used, for example, to perform the interrogation circuit functions 190 can also be implemented as separate components that communicate with the ASIC 200, for example, through traces of the PCB 152.

Figure 4B:
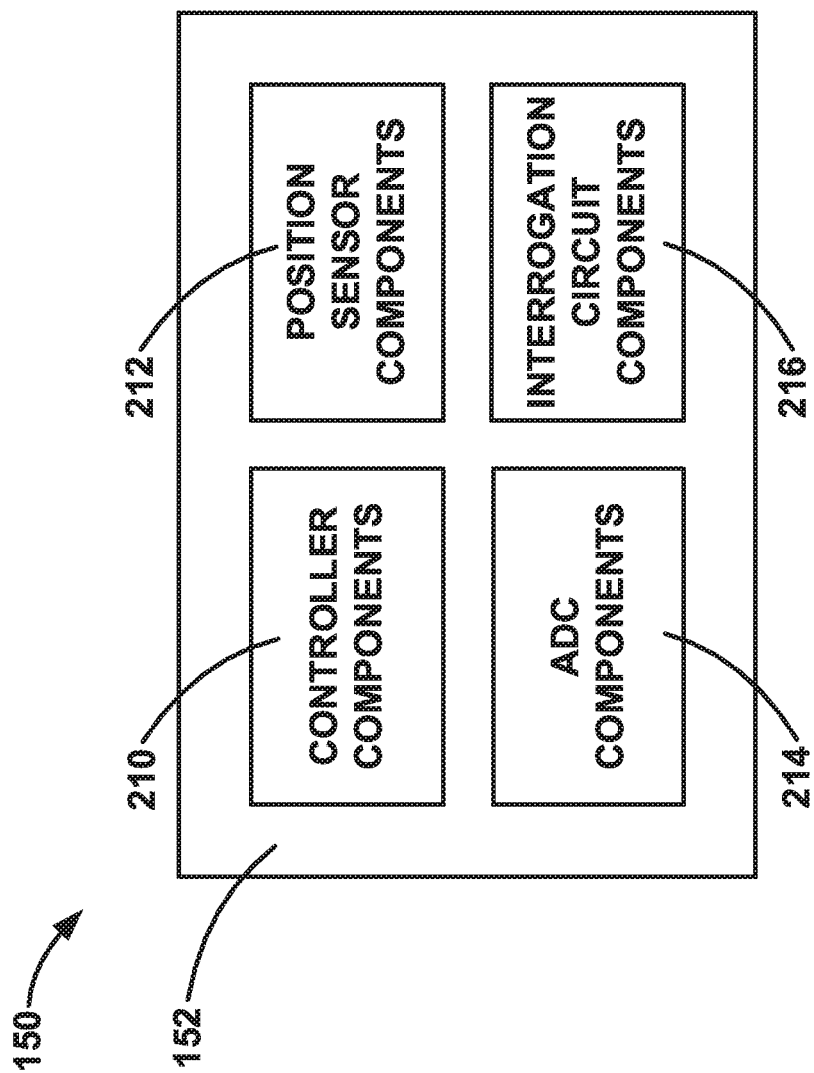
Figure 4C:
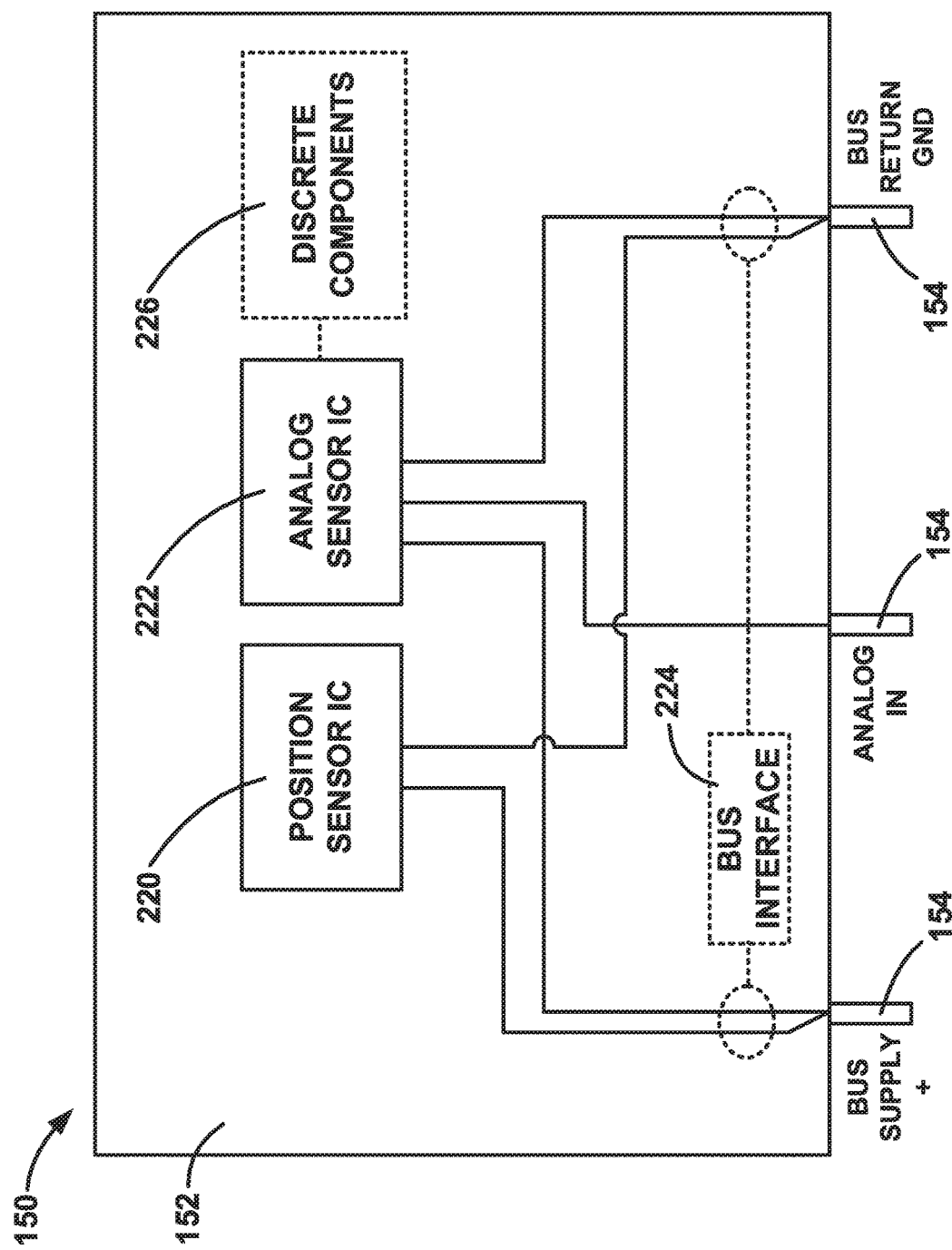

According to another example configuration illustrated in FIG. 4B, the SSD sensor 150 can comprise one or more standard, off-the-shelf components that can be configured, programmed, or otherwise arranged to perform the various functions of the sensor. The components can be arranged on a substrate, such as the PCB 152, using traces to provide and electrical connections and communication between the components.

For instance, in this example configuration, the controller functions 160 can be implemented in controller component(s) 210 comprising one or more of the following: application specific standard product (ASSP) ICs, field programmable gate arrays (FPGA), memory modules (ROM, RAM, EEPROM, flash, etc.), microcontrollers, system on a chip (SOC) devices, and CMOS logic state devices. The position sensor functions 170 and ADC functions 180 can also be implemented via be off-the-shelf sensor components 212 and ADC components 214. The interrogation circuit 190 could comprise discrete electronic components 216 (e.g., resistors, capacitors, transistors, diodes, etc.) arranged in a circuit configured to interrogate the external analog device using BUS voltage, to receive and condition the resulting analog signal, and to provide the analog signal to the ADC components 214.

According to another example configuration illustrated in FIG. 4C, the SSD sensor 150 can include individual standard off-the-shelf sensor ICs configured to perform the position sensing and analog sensing functions. In this example configuration, the SSD sensor 150 can include a first, position sensor IC 220 for performing the position sensing functions and providing the position data. This position sensor IC 220 could, for example, to be a Hall effect sensor IC.

Additionally, in this example configuration, the SSD sensor 150 could include a second analog sensor IC 222 configured to perform the analog interrogation, obtain the analog data, perform the ADC functions, and provide the digitized analog data. The analog sensor IC 222 can be configured, for example, to interface with a remote sensor via the ANALOG IN input 154. Since this component can be assigned the tasks of powering, interrogating, and conditioning the analog signal obtained from a remote analog sensor (e.g., inductive, capacitive, or resistive element), the analog sensor IC 222 can comprise discrete electronic components 226 (e.g., resistors, capacitors, transistors, diodes, etc.) necessary to perform these functions.

In this configuration, the position sensor IC 220 and the analog sensor IC 222 can be individually addressable and can thereby provide the position data and digitized analog data to the bus 112 via the BUS SUPPLY+ and BUS RETURN GND inputs 154 of the SSD sensor 150. Alternatively, the SSD sensor 150 could include a bus interface module 224 for interfacing with the ASICs, packaging the data, and providing the data via the BUS 112.

In the example configuration of FIG. 2, the system 100 includes SSD sensors 150a mounted to seatbelt buckles 120, and SSD sensors 150b mounted in vehicle seats 130. In each implementation of the sensors 150a, 150b, the position sensing function of the SSD sensor 150 is configured to detect the condition of the structure (i.e., buckle 120 or seat 130) to which the sensor is mounted. In the case of the seatbelt buckles 120, the position sensing function of the SSD sensors 150a is to detect the presence of the seatbelt tongue latched in the buckle, i.e., to detect when the seatbelt buckle is latched. The buckle latched detection can, for example, be determined by sensing the position of the tongue itself or by sensing the position of a buckle component indicative of the buckle being latched. In one specific implementation, the position sensing function of the SSD sensors 150a can be that of a Hall effect sensor configured as a seatbelt buckle latch sensor. In this implementation, a seatbelt buckle component can be fitted with a magnet configured such that, when the buckle is latched, the magnetic field of the magnet acts on the Hall effect sensor, thereby indicating that the buckle is latched.

In the case of the vehicle seats 130, the position sensing function of the SSD sensors 150b can be that of a seat track position sensor (STPS, see FIG. 1) configured to detect the forward/rearward position of the vehicle seat. More specifically, the position sensing function of the SSD sensors 150b can be that of a Hall effect sensor configured as an STPS configured to detect the forward/rearward position of the vehicle seat. For instance, the STPS function of the SSD sensors 150b can be to determine whether the associated vehicle seat 130 is forward/rearward of a predetermined position, thus giving an indication occupant size and/or position.

In each implementation of the SSD sensors 150a, 150b, the analog input sensing function of the sensor can be implemented to facilitate the detection of a vehicle/occupant condition associated with the seating position of the sensor. For example, the SSD sensors 150a associated with the seatbelt buckles 120 can have the analog input sensing function configured as passenger presence detectors (PPDs) 122. In this instance, the PPDs 122 can be resistive sensors configured to detect the presence of an occupant, for example, in response to strain on the seat structure itself (i.e., a strain gauge) or deflection in the seat cushion resulting from an occupant being seated on the seat 120.

The analog input sensing function of the SSD sensors 150b associated with the vehicle seats 130 can also provide sensed indication of vehicle/conditions in addition to the STPS functionality described above. For example, the analog input sensing function of the SSD sensors 150b can be to interface with a seat recline position sensor (SRC) 132 of the associated vehicle seat. This is shown in dashed lines for seat N in FIG. 2. Of course, the analog input of any SSD sensor 150a, 150b could, depending on circumstances, such as seat position, go unused, as shown for seats 1 and 2 of FIG. 2. Of course, in this instance, the SSD sensor 150 would provide only the position sensor data.

Figure 5A:
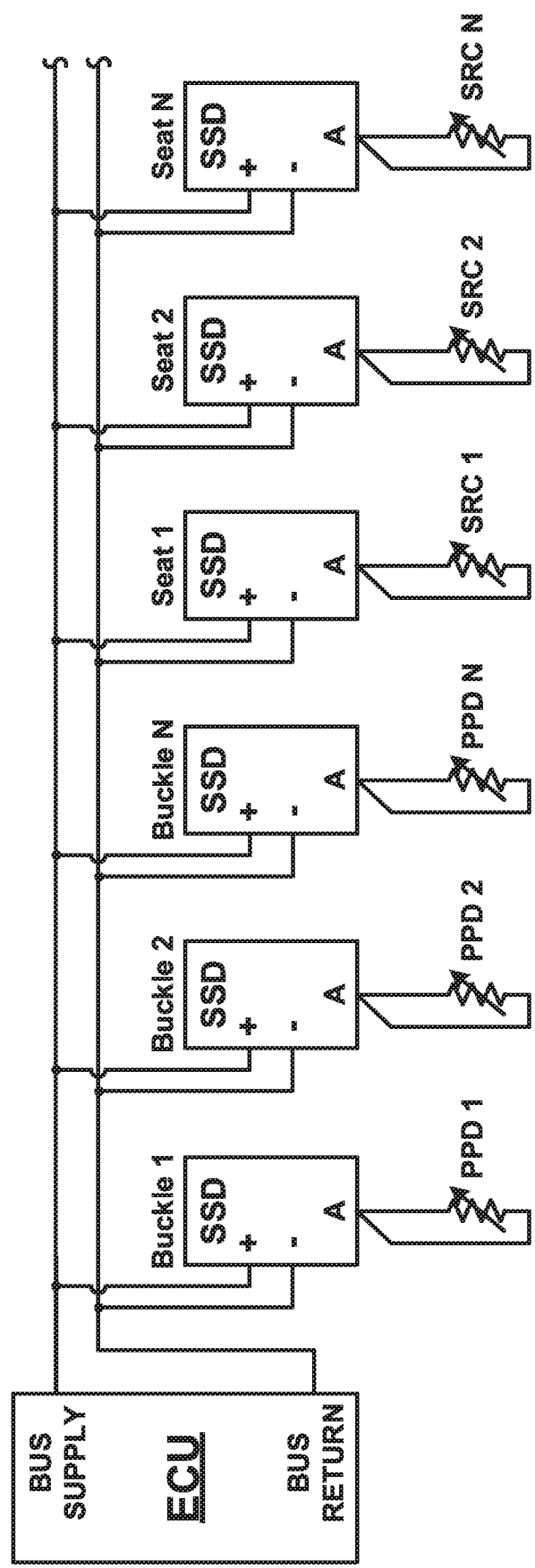
FIGS. 5A and 5B are schematic illustrations of example wiring configurations for the vehicle system.
Figure 5B:
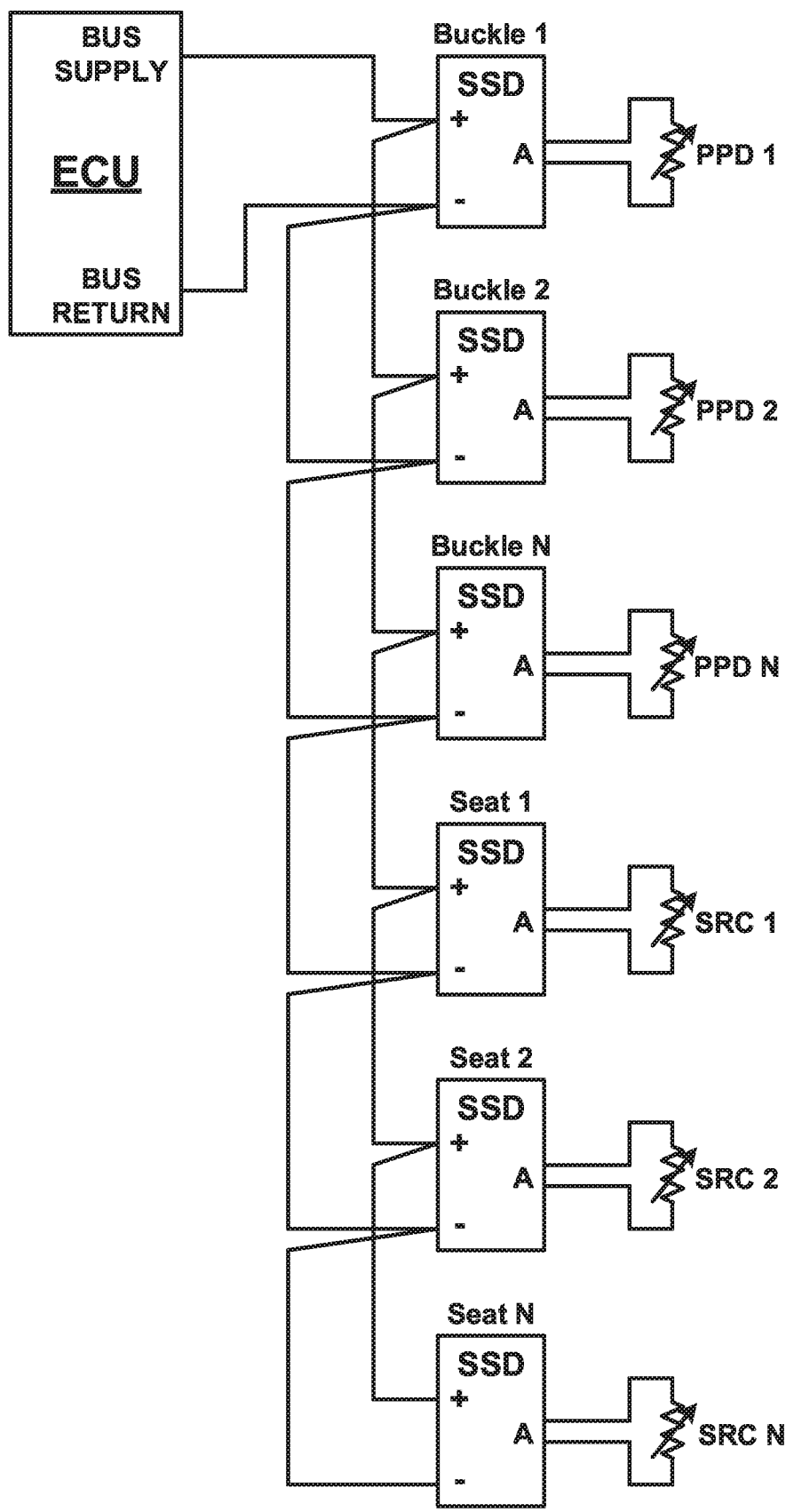

Advantageously, the SSD sensors 150 provide both position sensing and analog input sensing capabilities that is communicated to the ECU 110 via the two-wire BUS 112. This avoids the complicated and costly wiring of previous systems (see FIG. 1) without sacrificing functionality. Since each seatbelt buckle 120 is associated with a vehicle seat 130 (or seating position in bench seating vehicles), the bus wires can be routed to adjacent or near each seat, and wire drops can be routed to each sensor 150, whether in the seat 130 or seatbelt buckle 120. This is shown schematically in FIG. 5A. Alternatively, instead of wire drops, the sensors 150 could be daisy-chained on the bus supply and bus return wires. This is shown schematically in FIG. 5B.

As another advantage, since the BUS 112 can be both a power and data bus, the power function can be tapped to power the position sensing function, e.g., Hall effect sensors, and the interrogation of the analog inputs. Since the BUS return function is grounded (GND), the analog input (PPD sensor, seat recline sensor) can be a two-wire input without requiring a separate ground connection. This can further simplify the wiring and is shown schematically in FIGS. 5A and 5B. Thus, for example, the seatbelt buckle 120 can be assembled with the SSD sensor 150a installed and a terminal lead for the BUS 112 connections protruding therefrom. Additionally, a lead for the analog input could also protrude from the buckle 120. With the buckle 120 installed, the BUS lead and the analog input lead can be connected to the BUS 112 and the analog devices 122, 132.

From the above description of the invention, those skilled in the art will perceive applications, improvements, changes and modifications to the invention. Such applications, improvements, changes and modifications within the skill of the art are intended to be covered by the appended claims.

The invention claimed is:

1. A state detection sensor for a vehicle including a seat and a seatbelt associated with the seat, comprising:
   a housing configured to be mounted to a vehicle component,
   the vehicle component being one of the seat and the seatbelt buckle;
   a position sensing component mounted in the housing and being configured to
   provide position data in response to detecting the presence or
   position of structure of the vehicle component relative to the sensor;
   an analog input component mounted in the housing and being configured to
   receive an analog signal from an external analog sensor,
   wherein the analog sensor is configured to be mounted to one of
   the seat and
   seatbelt buckle;
   an analog to digital converter (ADC) component configured to receive the analog signal from the analog input component, digitize the analog signal, and
   provide digitized external analog sensor data; and
   a component configured to communicate the position data and the external analog sensor data via a serial bus,
   wherein the state detection sensor comprises
   a vehicle seat sensor,
   wherein the position sensing component comprises a seat track position sensor.

2. The state detection sensor recited in claim 1, wherein the position sensing component comprises a Hall effect sensor.

3. The state detection sensor recited in claim 1, wherein the analog input component comprises an interrogation circuit configured to supply bus power to the external analog sensor in order to interrogate the external analog sensor.

4. The state detection sensor recited in claim 1, wherein the external analog sensor comprises a resistance sensor.

5. The state detection sensor recited in claim 1, wherein the external analog sensor comprises a strain gauge or a variable resistor.

6. The state detection sensor recited in claim 1, wherein the seat track position sensor comprises a Hall effect sensor configured to detect a magnetic field indicative of the seat position.

7. The state detection sensor recited in claim 1, wherein the external analog sensor comprises a vehicle seat recline position sensor.

8. The state detection sensor recited in claim 1, wherein the state detection sensor comprises an application specific integrated circuit (ASIC) comprising at least a portion of the position sensing component and at least a portion of the analog input component.

9. The state detection sensor recited in claim 8, further comprising a Hall effect sensor operably connected to the ASIC and configured to cooperate with the ASIC to perform position sensing functions.

10. The state detection sensor recited in claim 8, further comprising discrete analog components operably connected to the ASIC and configured to cooperate with the ASIC to perform interrogation functions on the external analog sensor.

11. The state detection sensor recited in claim 1, wherein the position sensing component and the analog input component of the state detection sensor each comprise at least one of: application specific standard product ICs, field programmable gate arrays, memory modules, microcontrollers, system on a chip devices, CMOS logic state devices, and discrete electronic components.

12. The state detection sensor recited in claim 1, wherein the position sensing component comprises a position sensor IC and the analog input component comprises an analog sensor IC.

13. The state detection sensor recited in claim 12, wherein the position sensor IC comprises a Hall effect sensor IC.

14. The state detection sensor recited in claim 12, wherein the position sensor IC and the analog input IC are individually addressable devices and can be polled via a serial bus individually.

15. A vehicle safety system comprising:
the state detection sensor recited in claim 1;
an electronic controller unit (ECU); and
a two-wire power/communication bus operatively connected to the ECU, wherein the state detection sensor comprises connectors for connecting the sensor to the bus in parallel.

16. The vehicle safety system recited in claim 15, further comprising a vehicle occupant protection device actuatable to help protect a vehicle occupant, wherein the vehicle safety system is configured to actuate the protection device in response to a vehicle crash event and to tailor deployment of the protection device in response to at least one of the position data and the external analog sensor data.

17. A state detection sensing system for a vehicle seat, comprising:
a sensor housing configured to be mounted to a seat track of the vehicle seat;
a position sensing component mounted in the sensor housing and being configured to provide digital seat position data in response to detecting the presence or position of seat frame structure relative to the state detection sensor;
a seat sensor external to the sensor housing configured to be mounted to the seat frame structure, the seat sensor being configured to sense a seat condition and provide an analog signal indicative of the sensed seat condition;
an analog input component mounted in the sensor housing and connected to the seat sensor, the analog input component being configured to receive the analog signal from the seat sensor;
an analog to digital converter (ADC) component mounted in the sensor housing and configured to digitize the analog signal from the seat sensor, and to provide digitized seat sensor data; and
a component mounted in the sensor housing and configured to communicate the seat position data and the digitized seat sensor data via a serial bus.

* * * * *